United States Patent [19]

Takada

[11] 4,392,620
[45] Jul. 12, 1983

[54] EMERGENCY LOCKING RETRACTOR FOR A VEHICLE OCCUPANT RESTRAINT BELT

[76] Inventor: Juichiro Takada, 3-12-1 Shinmachi, Setagayaku, Tokyo, Japan

[21] Appl. No.: 267,890

[22] Filed: May 28, 1981

[30] Foreign Application Priority Data

Jun. 2, 1980 [JP] Japan .................................. 55-72737
Jun. 2, 1980 [JP] Japan .................................. 55-72738

[51] Int. Cl.³ ........................ A62B 35/02; B65H 75/48
[52] U.S. Cl. ........................ 242/107.4 A; 242/107.4 B
[58] Field of Search ................ 242/107.4 B, 107.4 A; 280/806; 297/478, 480

[56] References Cited

U.S. PATENT DOCUMENTS

| | | | |
|---|---|---|---|
| 4,101,092 | 7/1978 | Schmelow | 242/107.4 B |
| 4,141,518 | 2/1979 | Yamanashi | 242/107.4 B X |
| 4,186,895 | 2/1980 | Burghardt et al. | 242/107.4 B |
| 4,258,887 | 3/1981 | Fohl | 242/107.4 B X |
| 4,278,216 | 7/1981 | Takada | 242/107.4 B X |

Primary Examiner—John M. Jillions
Attorney, Agent, or Firm—Brumbaugh, Graves, Donohue & Raymond

[57] ABSTRACT

An emergency locking retractor for a vehicle occupant restraint belt comprises a locking mechanism having an inner disc that is received on the reel shaft for axial movement toward and away from a side frame member in which the reel is supported, an inertia spring that normally holds the inner disc in an outward position in which the mechanism is unlocked, and an outer disc fixed on the shaft against axial outward movement away from the frame. One of the two discs is rotatable relative to the shaft, while the other rotates with the shaft, and coating cam elements on the inner and outer discs shift the inner disc toward the frame when the reel is pulled out abruptly and engage coacting locking ratchet teeth on the inner disc and the frame to stop the inner disc from rotating. The reel shaft is locked to the inner disc by a flange on the shaft having lugs that fit into locking slots in the inner disc. A third set of ratchet teeth on the circumference of the rotatable disc are engageable by the pawl of an inertia-responsive device and initiate the same locking operations as the abrupt pulling out of the belt produces.

5 Claims, 6 Drawing Figures

EMERGENCY LOCKING RETRACTOR FOR A VEHICLE OCCUPANT RESTRAINT BELT

The present invention relates to belt retractors for use in vehicle occupant restraint belt systems and, in particular, to retractors of the so-called emergency locking type that ordinarily permit the belt to be pulled from the reel but which are locked in the event of an abrupt change in the velocity of the vehicle, such as occurs in a sudden stop or a collision.

BACKGROUND OF THE INVENTION

Among the many types of emergency locking retractors that have been proposed over the years are those which respond to a rapid pulling out of the belt, such as that which occurs when the occupant of the vehicle is thrown forward in a collision, an upset or an abrupt stop. This type of retractor generally includes an inertia wheel which rotates with the belt reel when the reel is pulled out relatively slowly but which lags behind the belt reel when the belt is pulled out rapidly. The inertia wheel ordinarily works in conjunction with springs that assist in maintaining a fixed relationship between the positions of the belt reel and the inertia wheel up to some selected rate of rotation. When the selected rate of rotation is exceeded, the rotational inertia of the inertia wheel produces a lag in the rotation of the inertia wheel behind that of the belt reel. Some sort of mechanism associated with the inertia wheel responds to the lag in the rotation of the inertia wheel by locking the belt reel against rotation.

With this type of retractor the attainment of relatively great sensitivity in the mechanism, which is desirable to lock the reel against pullout of the belt when the speed at which the occupant is thrown forward is relatively low, results in the tendency for the mechanism to lock the belt when the occupant is simply pulling the belt out in the process of hooking it up. Similarly, the locking caused by a sensitive mechanism may occur during operation of the transfer device of a passive belt system that automatically moves the belt between a restraining configuration and releasing configuration. To overcome the inconvenience of undesired locking, it has been desirable to lessen the sensitivity of the inertia mechanism, which has meant that the retractor does not lock in the absence of a relatively rapid pullout. In general the belt-pullout sensitive types of retractors have been constructed to lock only when the passenger is thrown forward with an acceleration of about 0.7 g or higher.

The above-described problem with belt-pullout sensitive retractors has led to the development of retractors which lock not only in response to rapid pullout of the belt but to an inertia-responsive device, such as a pendulum type of device, that detects a rapid change in velocity of the vehicle, or, to be more precise, the inertia-responsive device itself. Several types of so-called "double safety" locking systems which use both a belt-pullout sensitive system and an inertia-responsive device to lock the reel have been proposed and commercialized. Examples of such double safety belt retractors are described and shown in U.S. Pat. Nos. 3,958,774, 4,109,881 and 3,897,024 (reissued as RE No. 29,594), the last of which is owned by the assignee of the present invention.

Generally, the belt pull-out sensitive retractors and double safety type retractors that have been commercialized have been judged adequate from the functional point of view. However, they have, depending on the particular one in question, a variety of disadvantages such as mechanical complexity involving a relatively large number of parts, difficulty and, therefore, high cost of assembly, unduly large size, or unduly high weight.

SUMMARY OF THE INVENTION

The present invention is an emergency locking retractor for a vehicle occupant restraint belt that includes, essentially, a belt pull-out sensitive locking mechanism and, optionally but preferably, an inertia-sensitive locking mechanism as well. It has the advantages of using comparatively few parts, all of which are easy to manufacture, and of being easy to assemble, inasmuch as there are no small or intricate components. The ease of manufacture and assembly contribute to a comparatively low cost. The retractor is also relatively small and low in weight and yet highly durable.

Like conventional emergency locking retractors, a retractor, according to the present invention, includes a generally U-shaped frame, a belt reel having a shaft mounted for rotation in the side portions of the frame and a rewinding spring that urges the reel shaft to rotate in a direction to wind the belt onto the reel. A reel locking mechanism is carried by a portion of the reel shaft that extends outwardly from one side portion of the frame.

The present invention is characterized in that the locking mechanism comprises a circular row of equally spaced-apart first locking ratchet teeth on the outer face of the side portion of the frame and located concentrically to the axis of rotation of the reel shaft. A flange is affixed to the reel shaft portion outwardly of the frame. The reel shaft receives an inner disc immediately outwardly of the flange that moves within limits in the axial direction toward and away from the flange and has a row of second locking ratchet teeth that are engageable with the first locking teeth when the inner disc moves toward the frame. An inertia spring engages the inner disc and urges it in a direction away from the flange. The shaft portion also receives an outer disc immediately outwardly of the inner disc and retained on the shaft against movement in a direction axially along the shaft away from the frame. Coacting cam elements on the inner and outer discs move the inner disc toward the frame, against the resisting force of the inertia spring, upon rotation of one of the discs relative to the other. One of the two discs is coupled to the shaft so that it rotates conjointly with the shaft, and the other disc is rotatably carried on the shaft portion so that when the shaft is accelerated in response to a relatively high acceleration of the belt in the unwinding direction resulting from in excess of about 0.7 g acceleration of the vehicle occupant, the rotatable disc lags the rotation of the shaft. Accordingly, the inner disc is thereupon shifted toward the frame by the cam elements. The flange has lugs that are received in corresponding slots in the inner disc that lock the reel shaft to the inner disc when the inner disc is locked to the frame by the first and second, then-meshing locking ratchet teeth.

The rotational force in the belt unwinding direction is transmitted from the reel shaft portion to the flange and by the flange through the lugs into the inner disc. There are several lugs, and they are located a relatively large distance from the axis of the shaft. Therefore, the forces transmitted between the lugs and the inner disc are individually relatively low, and the flange and inner disc can be of comparatively light weight construction and yet provide the strength required to endure the very high forces that are exerted by the restraint belt on the retractor in a vehicle collision. Similarly, the inner disc is locked to the side frame by the meshing first and second ratchet teeth, which can be located at a fairly substantial distance axis from the shaft, thereby keeping forces low. The first ratchet teeth on the frame can be formed on a ring made of plastic that is suitably attached to the metal frame of the retractor. The inner and outer discs of the locking mechanism can also be made of plastic, which provides the advantages of low cost of manufacture, low weight, high resistance to corrosion, low coefficient of friction and other attributes beneficial to effective operation and durability. These characteristics are afforded, in turn, by the way in which forces are transmitted from the reel shaft to the locking ratchet teeth, namely by distribution among several elements that are located at a comparatively large distance from the axis of the reel shaft.

Although the locking mechanism described above can be used in a retractor which locks only in response to rapid pullout of the belt, it is preferable, according to the present invention, to provide a third set of ratchet teeth around the circumference of the disc that is rotatable on the reel shaft and an inertia-responsive device that includes a pawl that engages any of the third ratchet teeth in response to an acceleration of the inertia-responsive device above a selected value, typically about 0.3 g. The inertia-responsive device enables the sensitivity of the retractor to be maintained while reducing the sensitivity of the belt pull-out responsive mechanism. The inertia-responsive device responds to a lower acceleration than the pull-out responsive device and virtually instantaneously locks the reel against pulling out of the belt, even though the belt pull-out sensitive feature of the locking mechanism does not respond.

In order to enable a relaxation of the tolerances in the complete retractor assembly, it is advantageous to provide the third ratchet teeth on a separate ring that can rotate relative to the rotatable disc of the mechanism to a limited extent and a spring connected between the disc and the ring that urges the ring to rotate relative to the disc to a selected position timed, relative to the cam elements, to ensure locking of the disc in response to the inertia-responsive device. The spring can yield and permit rotation of the disc relative to the ring and thereby minimize the force on the pawl to substantially that generated by the spring.

As will be apparent from the following description of the embodiments shown in the accompanying drawings. The functions of the inner and outer disc can be interchanged to some extent by comparatively small changes in the construction of the mechanism. In one embodiment the outer disc is rotatably carried on the shaft, and the inner disc is coupled to the shaft for rotation conjointly with the shaft in both the belt-winding and belt-unwinding directions. Alternatively, the inner disc is rotatably carried on the shaft portion for lost motion to an extent that enables the cam elements on the two discs to urge the inner disc toward the frame and lock the first and second ratchet teeth, while the outer disc is affixed to the shaft portion for rotation conjointly therewith. In the first version it is the outer disc that responds to inertia and lags rotation of the inner disc to provide the camming action for locking the mechanism. In the other version it is the inner disc that responds to inertia and lags the rotation of the fixed outer disc to provide the camming action for locking the mechanism.

DESCRIPTION OF THE DRAWINGS

FIG. 2 is a front cross-sectional view of the embodiment of FIG. 1 taken along a plane represented generally by the lines 2—2 of FIG. 3 and in the direction of the arrows;

DESCRIPTION OF EXEMPLARY EMBODIMENTS

Figure 1:
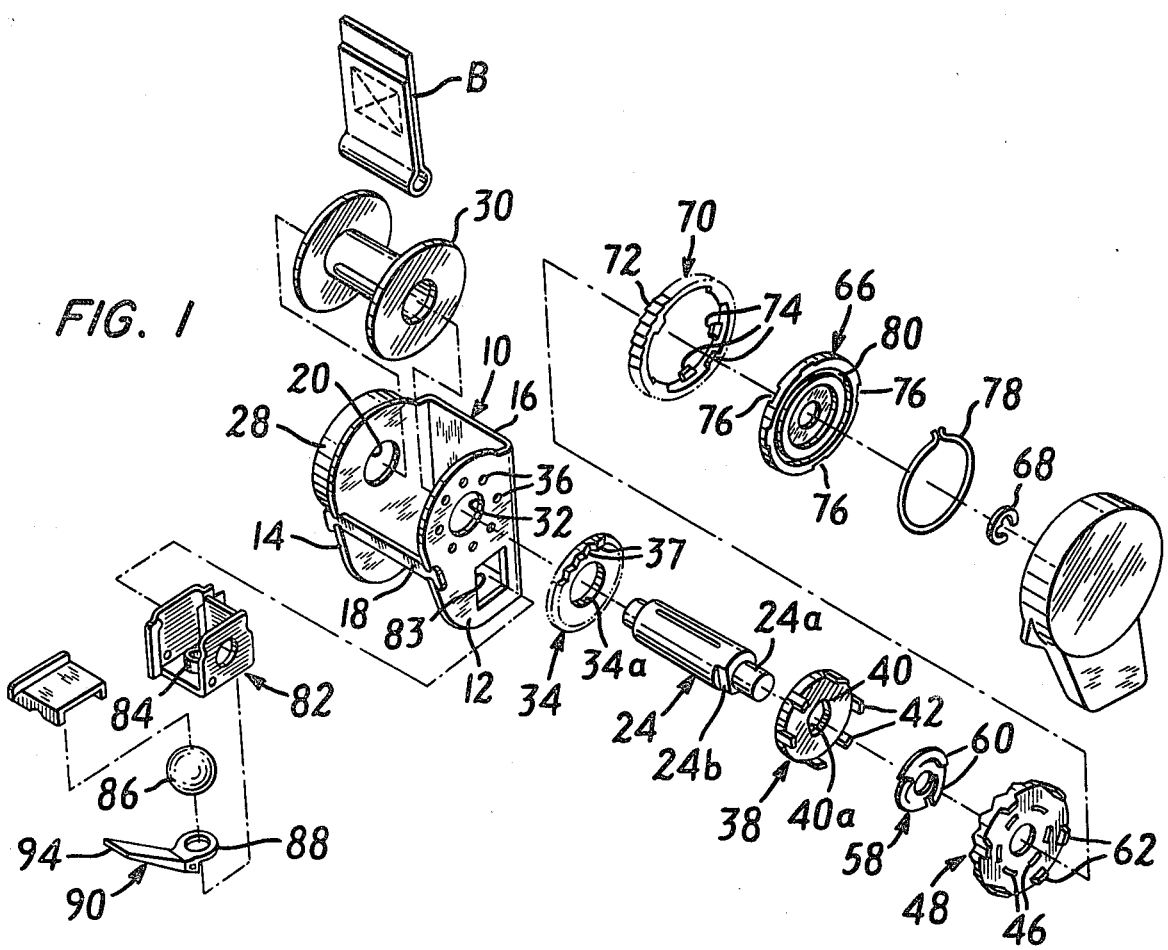
FIG. 1 is an exploded pictorial view of one embodiment of the present invention.
Figure 3:
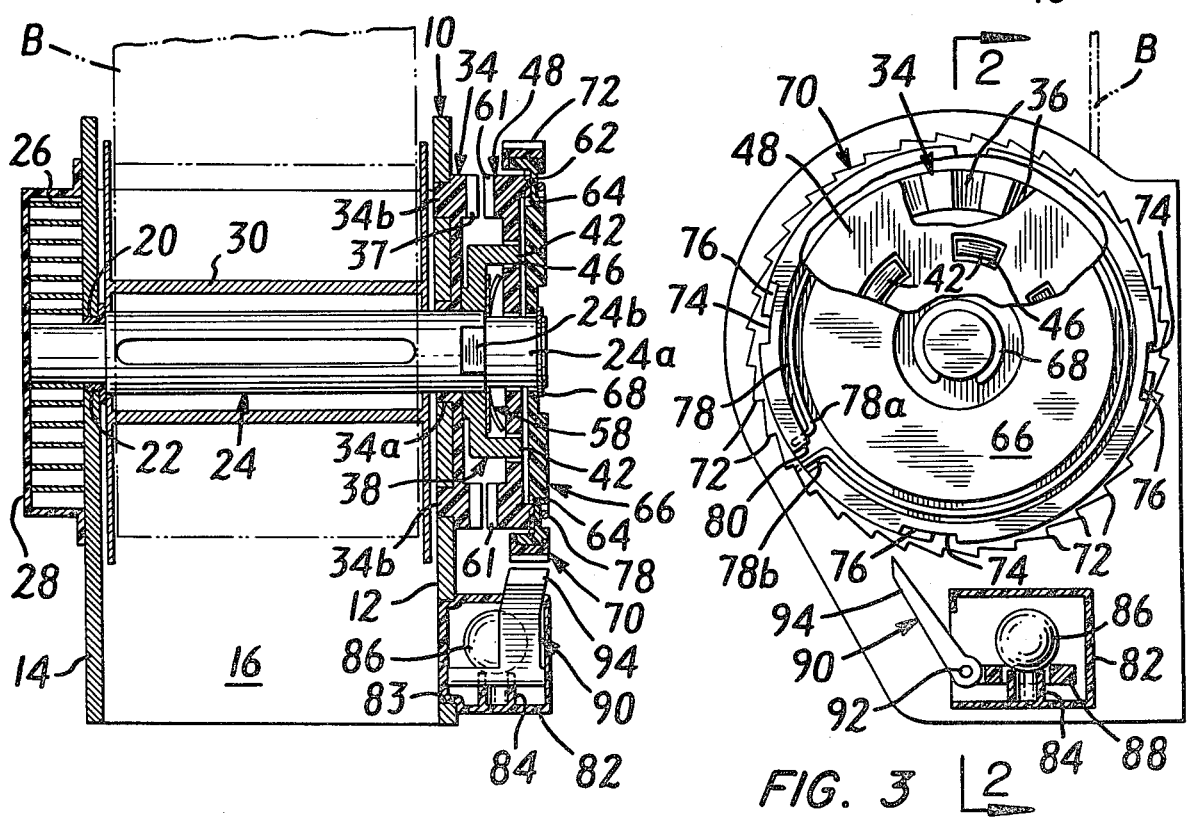
FIG. 3 is an end view of the retractor with portions broken away and shown in cross-section for clearer illustration.

The embodiment shown in FIGS. 1 to 3 comprises a generally U-shaped frame 10 having a pair of side wall portions 12 and 14 connected by a base 16 and a crosspiece 18. The frame side portion 14 has a hole 20 that receives a bushing 22 and supports one end of a reel shaft 24. A spiral spring 26 connected between a cover 28 and the shaft 24 urges the shaft to rotate in a direction to rewind the restraint belt B onto a reel 30 that is carried by the shaft.

A portion 24a of the shaft 24 extends out through a hole 32 in the frame side portion 12 and is supported in the hole 32 by a bushing rim portion 34a of a ratchet disc 34 that is suitably affixed to the frame portion 12, such as by a circular row of pins 34b that extend into corresponding holes 36 in the side portion 12. The ring 34 can be fastened to the frame by an adhesive or by thermally deforming some or all of the inner ends of the pins 34b to make them fit tightly in the holes 36. The disc 34 has a circular row of ratchet teeth 37 that are equally spaced apart from each other and are disposed concentrically to the axis of the shaft 24.

The shaft portion 24a receives a flange 38, and has a flat 24b that is matched by a flat 40a in the hole 40 in the flange 38, so the flange 38 rotates with the flange 34. A series of lugs 42 extend axially (relative to the shaft 24) from the perimeter of the flange 38 into slots 46 in an inner disc 48 that is received on a reduced diameter part of the portion 24a of the shaft for movement in the axial direction toward and away from the ratchet ring 34. An inertia spring 58 having several resilient tangs 60 urges the inner disc 48 outwardly away from the ratchet disc 34 and maintains a circular row of second locking ratchet teeth 61 on the inner face of the disc 48 out of engagement with the first ratchet teeth 37 on the reel frame. A circular row of cam elements 62 adjacent the perimeter of the outwardly facing surface of the disc 48 are matched by companion cam elements 64 on the inner face of an outer disc 66 that is supported for rotation on the shaft portion 24a and is fixed against movement away from the frame by an E-ring 68.

The inertia spring 58 normally holds the inner disc in the outward position shown in FIG. 2 in which the cam elements 62 and 64 on the two discs intermesh. At relatively low levels of acceleration of the belt B in the unwinding direction (counterclockwise in FIG. 2), the outer disc rotates conjointly with the inner disc, rotation with the shaft 24 being transmitted through the flange 38 to the inner disc by means of the interlocking action of the lugs 42 and the slots 46 in the inner disc. When the belt B is pulled out rapidly as a result of acceleration of the occupant at a level above about 0.7 g, the inertia of the outer disc 66 causes it to lag the rotation of the inner disc; the spring force of the inertia spring 58 is overcome, and the cam elements 62 and 64 on the inner and outer discs shift the inner disc inwardly toward the frame and bring the locking ratchet teeth 37 and 61 into engagement, thereby locking the inner disc to the frame. Inasmuch as the flange 38 is locked to the inner disc 48 by the lugs 42 and the slots 46, the reel 30 is prevented from rotating, and the belt is stopped from unwinding, thereby to keep the vehicle occupant from being thrown forward. When the force on the belt in the unwinding direction ceases, the inertia spring restores the inner disc to an outward, release position, which is enabled by the reverse camming action by the cam elements 62 and 64, which are restored to a "meshed" condition—the spring force is adequate to produce camming that rotates the outer disc 66 in a clockwise direction relative to the inner disc 48.

The outer disc 66 receives a ratchet ring 70 having a series of uniformly spaced ratchet teeth 72 on its circumferential surface that face in a direction against the direction of rotation of the locking mechanism in a belt unwinding direction. The ring 70 fits relatively loosely over the outer circumference of the outer ring 66 but is held in place axially by means of inwardly directed lugs 74 that fit into notches 76 in both faces of the outer disc 66. The notches are longer in the circumferential direction than are the lugs so that the ring 70 can rotate relative to the outer disc 66 within the limitation of the lengths of the slots 76. A loop spring 78 is received in a groove 80 in the outer disc 66 and is connected at one end 78a to the outer disc 66 by reception of a bent-out end portion in a receiving hole 80 and is fastened at the other end 78b to the ratchet ring 70 in a similar manner. The spring 78 urges the ratchet 70 in a counterclockwise direction (with reference to FIG. 3 of the drawings) relative to the outer disc 66.

The supporting casing 82 of an inertia-responsive device fits into a hole 83 in the frame side portion 12 in a position below the locking assembly. It will be understood by those skilled in the art that the particular position of the inertia-responsive device can be varied, depending upon the orientation of the retractor in a particular installation. An upwardly extending circular flange 84 supports a spherical mass 86. At values of acceleration that are less than a selected value, such as 0.3 g, the mass 86 remains in the circular seat defined by the flange 84. When the acceleration exceeds about 0.3 g, the mass rolls out of the seat and pushes down on an annular arm 88 of a pawl 90 that pivots about an axle 92 attached to the case 82, thereby pivoting the tip portion 94 of the pawl toward the ratchet ring 70. One of the ratchet teeth 72 will engage the tip 94 of the pawl, and the outer disc will, therefore, be stopped from rotating, should the belt start to pull out from the reel. Any rotation of the inner disk 48 in a clockwise direction (relative to FIG. 3) with the reel and reel flange will produce the camming action between the companion cam elements 62 and 64 on the inner and outer discs, thereby shifting the inner disc inwardly, locking the locking ratchet teeth and preventing further rotation of the reel 30. When the pull-out force on the belt B ceases, the locking mechanism is restored to the unlocked condition in the same manner as described above in connection with the operation of the device in response to rapid pull-out of the belt.

The operation of the spring 78 in conjunction with the ring 70 in limiting forces imposed on the pawl 90 will be readily understood from the description below of the corresponding elements of the embodiment of FIGS. 4 to 6.

Figure 4:
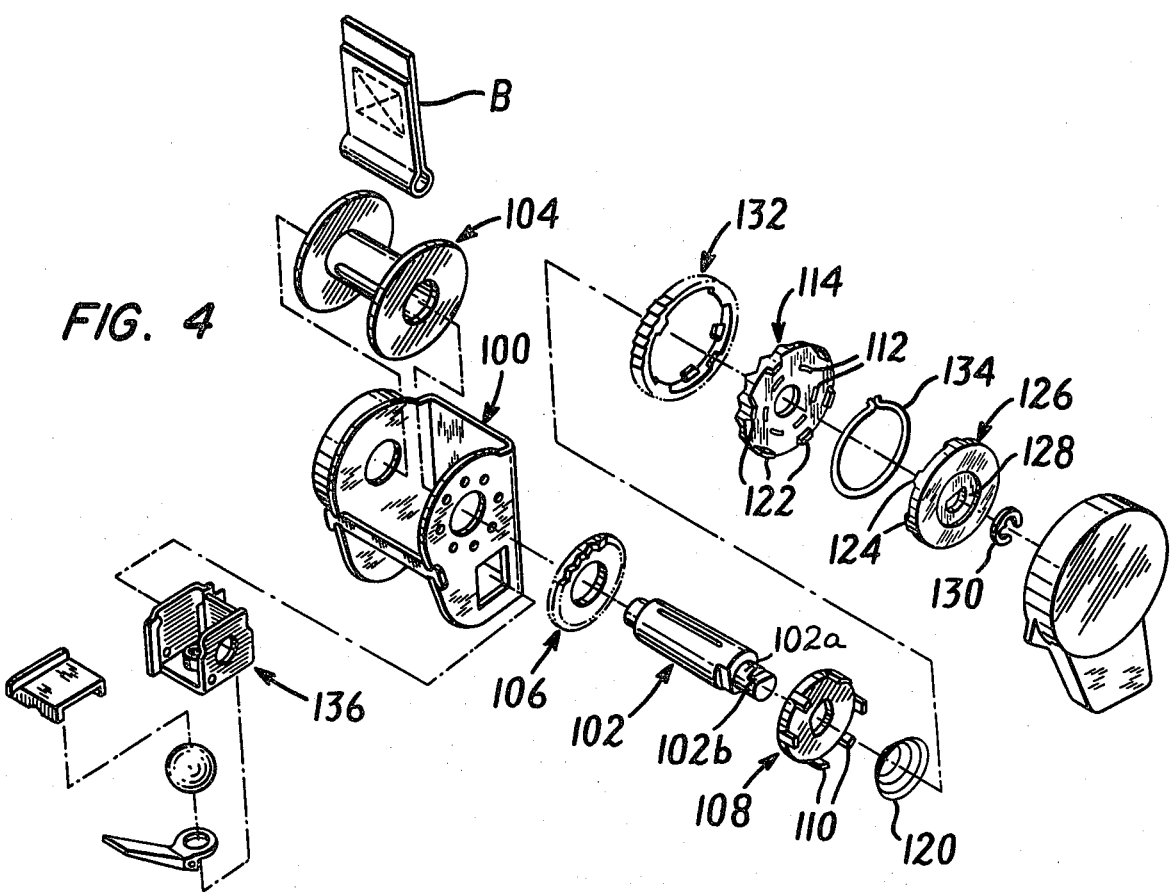
FIG. 4 is an exploded pictorial view of another embodiment of the present invention.
Figure 5:
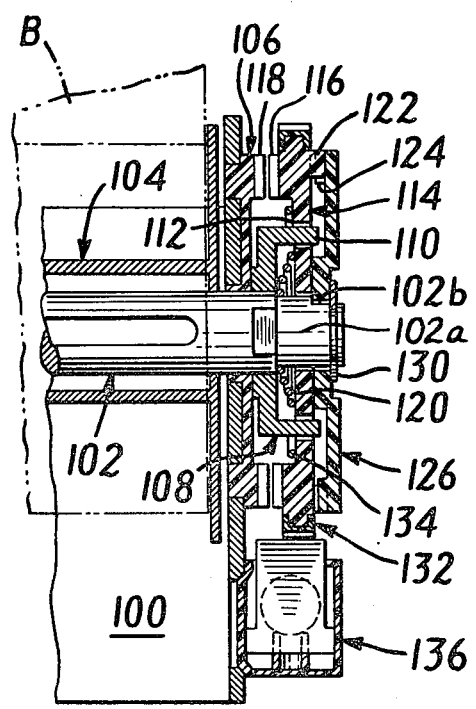
FIG. 5 is a partial front cross-sectional view of the embodiment of FIG. 4 taken generally along the lines 5—5 of FIG. 6 and in the direction of the arrows.
Figure 6:
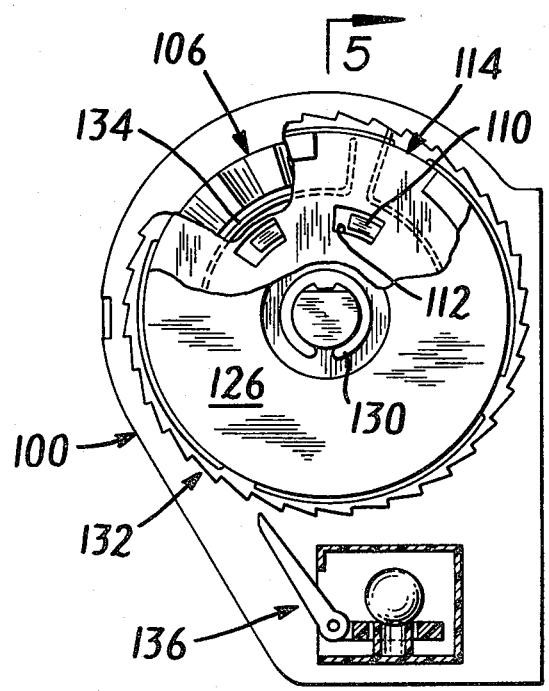
FIG. 6 is an end view of the embodiment of FIGS. 4 and 5 with portions broken away.

The embodiment of the invention shown in FIGS. 4 to 6 is similar in many respects to the embodiment of FIGS. 1 to 3, but there are some important differences that warrant description. The frame 100, the shaft 102, the reel 104 and the ratchet disc 106 in the embodiment of FIGS. 4 to 6 are essentially the same as the corresponding parts in FIGS. 1 to 3. Moreover, the outwardly extending portion 102a of the shaft 102 receives a flange 108 having a series of axially outwardly extending lugs 110 that are received in slots 112 of an inner disc 114. Unlike the embodiment of FIGS. 1 to 3, the mechanism of FIGS. 4 to 6 provides not only for axial movement of the inner disc 114 on the shaft between an unlocked position and a locked position but for the rotation as well. The significance of this difference is described below. As in the first embodiment, locking ratchet teeth 116 and 118 on the inner disc 114 and the ratchet disc 106 are engageable to stop rotation of the inner disc and, therefore, the reel in the belt-winding direction, and an inertia spring 120 that is compressed between a shoulder on the shaft portion 102a and the inner face in the inner disc 114 urges the inner disc outwardly so the ratchet teeth do not normally engage. The spring 120 also normally maintains an inter-meshing and inactive relationship between companion cam elements 122 and 124 on the inner disc 114 and an outer disc 126. The outer disc 126, unlike the first embodiment, is affixed to the shaft portion 102a for rotation therewith by means of a flat 102b adjacent the end of the shaft and a companion flat 128 in the hole in the disc 126. Like the first embodiment an E-ring 130 retains the entire locking assembly on the shaft portion 102a and resists the relatively modest reaction force imposed by the inertia spring 120 on the discs 114 and 126.

In much in the same way as the ratchet ring 70 in the first embodiment is mounted for limited rotation relative to the outer disc 66, a ratchet ring 132 is received on the circumference of the inner disc 114 for several degrees of relative rotation. A loop spring 134 urges the ratchet ring 132 in a clockwise direction relative to the disc 114. An inertia-responsive device 136 responds to acceleration of the vehicle (or, to be more precise, acceleration of the casing for the inertia-responsive device), relative to the spherical mass, by engaging the pawl with the ratchet ring 132 and stopping the rotation of the inner disc 114.

The rotation of the outer disc 126 with the shaft while the inner disc 114 rotates through a limited angle, relative to the shaft, makes the inner disc 114 the inertia-responsive element, whereas in the embodiment of FIGS. 1 to 3 the outer disc is the inertia-responsive element.

When the belt B is pulled from the retractor at a level of acceleration of the occupant less than about 0.7 g, the reel shaft 102 and the flange 108 rotate in a counterclockwise direction (with reference to FIG. 6). The inertia spring 120 holds the inner disc outwardly so that the cam elements 122 and 124 are intermeshed. The outer disc 126 rotates with the shaft 102, and its rotation is imparted to the inner disc 114 due to the intermeshing of the cam elements 122 and 124. In the absence of abrupt rotation of the outer disc 126, the force of the inertia spring is sufficient to keep the cam elements 122 and 124 from pushing the inner disc inwardly and locking it to the ratchet ring 106. The relationship between the lugs 110 on the flange 108 and the slots 112 in the inner disc 114 is such that the lugs 110 reside in the clockwise ends of the slots 112.

When the belt is pulled abruptly from the retractor, the rotation of the reel imparts corresponding rotation to the outer disc 126. Because of the lost motion permitted by the relationship between the lugs 110 on the flange 108 and the slots 112 in the inner disc 114, the inertia of the inner disc 114 will cause it to lag the rotation of the outer disc 126, whereupon the cam elements 122 and 124 on the inner and outer discs shift the inner disc inwardly toward the frame so that the locking ratchet teeth 116 and 118 engage. The flange 108 rotates relative to the inner disc 114 to an extent such that the lugs 110 engages the counterclockwise ends of the slots 112 in the inner disc. Inasmuch as the inner disc is locked to the frame by the locking ratchet teeth 116 and 118, the flange, and therefore the shaft, become locked against further rotation because of the engagement between the lugs on the flange and the counter clockwise ends of the slots 112 in the inner disc 114.

In the event of an acceleration of the vehicle in any direction at a level above about 0.3 g, the inertia responsive device 136 will operate and engage the pawl tip with the ratchet ring 132, thereby stopping the rotation of the ratchet ring and causing the same camming action and locking of the inner disc to the reel frame by the locking ratchet teeth 116 and 118. The spring 134 keeps the force transmitted from the ring 132 to the pawl tip from exceeding substantially the spring force generated by the spring 134. The inner disc 114 can rotate clockwise sufficiently to fully seat the ratchet teeth 116 and 118, and any manufacturing and assembly tolerance variations are taken up by slight counterclockwise rotation of the inner disc 114 relative to the then-locked ratchet ring 132.

Thus, there is provided, in accordance with the present invention, a durable, comparatively small and lightweight retractor that is preferably of the double safety type, is made up of parts that are relatively simple to manufacture and that are assembled simply and with very little labor cost. It will be apparent that the components of the locking mechanism are assembled endwise seriatim onto the outwardly extending portion of the shaft without any intricate or delicate assembly operations. The tolerances in manufacture and assembly can be relaxed somewhat, as compared to conventional retractors of similar types, inasmuch as the spring acting between the inertia disc and the ratchet ring make it unnecessary to have precise timing between the belt pull-out responsive components and the inertia-responsive component. The timing between the cam members and the locking ratchet teeth can be such as to ensure full movement of the inner disc toward the side frame slightly before the ratchet teeth lock, and a small amount of overcamming can be accommodated.

The above described embodiments of the invention are intended to be merely exemplary, and numerous variations and modifications of them will be readily apparent to those skilled in the art without departing from the spirit and scope of the invention. All such variations and modifications are intended to be included within the scope of the invention as defined in the appended claims.

I claim:

1. An emergency locking retractor for a vehicle occupant restraint belt including a frame, a belt reel having a shaft mounted for rotation in the frame, a rewinding spring urging the reel shaft to rotate in a direction to wind the belt onto the reel and a reel locking mechanism located adjacent a side portion of the frame characterized in that the locking mechanism comprises a circular row of equally spaced apart first locking ratchet teeth on the outer face of said side portion of the frame and disposed concentrically to the axis of rotation of the reel shaft, a flange affixed on a reel shaft portion located outwardly of said frame side portion, an inner disc received on said shaft portion outwardly of the flange for limited axial movement toward and away from the flange and having a row of second locking ratchet teeth engageable with the first locking ratchet teeth upon movement of the inner disc toward the frame, an inertia spring engaging the inner disc and urging it in a direction away from the flange, an outer disc received on said shaft portion outwardly of the inner disc and retained thereon against movement in a direction axially of the shaft away from the frame, co-acting cam elements on the inner and outer discs adapted to cam the inner disc toward the frame upon rotation of one of the discs relative to the other, one of the discs being coupled to the shaft for rotation conjointly therewith and the other disc being rotatably carried on said shaft portion and having an inertia that causes it to lag the rotation of the disc that rotates with the shaft so that the inner disc is thereupon shifted toward the frame by the cam elements, and the flange having lugs received in corresponding slots in the inner disc and adapted to lock the reel shaft to the inner disc when the inner disc is locked to the frame by the locking ratchet teeth.

2. An emergency locking retractor according to claim 1 and characterized further in that the locking mechanism includes third ratchet teeth around the circumference of the disc that is rotatable on the reel shaft, and an inertia-responsive device that includes a pawl adapted to engage one of the third ratchet teeth in response to an acceleration of the inertia-responsive device above a selected value.

3. An emergency locking retractor according to claim 2 and characterized further in that the third ratchet teeth are located on a ring that is rotatable relative to the said disc that is rotatable, and there is a spring connected between the said disc and the ring and urging the ring to rotate relative to the said disc to a selected position timed relative to the cam elements to insure locking of the said disc in response to the inertia-responsive device, the spring being adapted to yield and permit rotation of the said disc relative to the ring and thereby minimize the force on the pawl to substantially that generated by the spring.

4. An emergency locking retractor according to any of claims 1, 2 and 3 and characterized further in that it is the outer disc that is rotatably carried on the shaft portion and the inner disc is coupled to the flange for rotation therewith in both the belt-winding and belt-unwinding directions.

5. An emergency locking retractor according to any of claims 1, 2 and 3 and characterized further in that it is the inner disc that is rotatably carried on the shaft portion, the outer disc is affixed to the shaft portion for rotation therewith, and the inner disc is coupled to the flange for limited relative rotation.

* * * * *